(12) United States Patent
Kato et al.

(10) Patent No.: US 7,887,456 B2
(45) Date of Patent: Feb. 15, 2011

(54) AUTOMATIC TRANSMISSION

(75) Inventors: Takaaki Kato, Anjo (JP); Tsuyoshi Fukaya, Kariya (JP); Takashi Ogawa, Toyohashi (JP); Akihito Hongoya, Akazaki (JP); Hiroyuki Tsukamoto, Chiryu (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 529 days.

(21) Appl. No.: 12/038,357

(22) Filed: Feb. 27, 2008

(65) Prior Publication Data
US 2008/0207382 A1    Aug. 28, 2008

(30) Foreign Application Priority Data
Feb. 28, 2007    (JP) .............................. 2007-049822

(51) Int. Cl.
*F16H 3/62* (2006.01)
(52) U.S. Cl. .................. 475/276; 475/281; 475/290
(58) Field of Classification Search .................. 475/271, 475/275–292
See application file for complete search history.

(56) References Cited

U.S. PATENT DOCUMENTS 7,753,820 B2 *    7/2010 Phillips et al. .............. 475/276

2008/0248913 A1 *    10/2008 Kato et al. .................. 475/276

FOREIGN PATENT DOCUMENTS

JP        2002-213545 A    7/2002

* cited by examiner

*Primary Examiner*—David D Le
*Assistant Examiner*—Derek D Knight
(74) *Attorney, Agent, or Firm*—Sughrue Mion, PLLC

(57) ABSTRACT

To provide an automatic transmission apparatus for forward 8-speed, which keeps a transmission gear ratio step in good balance.

The apparatus includes: a first planetary gear device PG0 having a ring gear R0 connected to an input shaft; a second planetary gear device PG1 having a carrier C1 connected to a carrier C0 of the first planetary gear device, and a sun gear S1 connected to R0; a third planetary gear device PG2 having a ring gear R2 connected to C1; a fourth planetary gear device PG3 having a sun gear S3 connected to a sun gear S2 of the third planetary gear device; a first clutch C-1 that selectively connects S2 to the input shaft; a second clutch C-2 that selectively connects C2 to the input shaft; a first brake B-1 that selectively regulates the rotation of R0; a second brake B-2 that selectively regulates the rotation of R2; a third brake B-3 that selectively regulates the rotation of S0; and a fourth brake B-4 that selectively regulates the rotation of R3. The apparatus further includes a third clutch C-3 that connects R0 and S1 to the input shaft, or connects R2 to C1. PG0 to PG3 are each provided as a single pinion type.

3 Claims, 11 Drawing Sheets

FIG. 7 (a)

| PLANETARY GEAR DEVICE | PG0 | PG1 | PG2 | PG3 |
|---|---|---|---|---|
| RATIO OF NUMBER OF TEETH $\lambda$ = Zs / Zr | $\lambda_0$ | $\lambda_1$ | $\lambda_2$ | $\lambda_3$ |
| | 0.440 | 0.440 | 0.394 | 0.394 |

Zs: NUMBER OF TEETH OF SUN GEAR S
Zr: NUMBER OF TEETH OF RING GEAR R

FIG. 7 (b)

| SPEED | ELEMENTS OF TRANSMISSION APPARATUS | | | | | | | | GEAR RATIO | STEP |
|---|---|---|---|---|---|---|---|---|---|---|
| | C-1 | C-2 | C-3 | B-1 | B-2 | B-3 | B-4 | FC | | |
| P | | | | | | | | | | |
| Rev 1 | | | ○ | ○ | | | ○ | | | |
| Rev 2 | | | ○ | | | ○ | ○ | | | |
| N | | | | | | | | | | |
| 1st | ○ | | | ● | | | (○) | ○ | 3.5385 | > 1.717 |
| 2nd | ○ | | | ● | ○ | | | | 2.0604 | > 1.324 |
| 3rd | ○ | | ○ | ○ | | | | | 1.5562 | > 1.311 |
| 4th | ○ | | ○ | | | | ○ | | 1.1866 | > 1.187 |
| 5th | ○ | ○ | ● | | | | | | 1.0000 | > 1.219 |
| 6th | | ○ | ○ | | | | ○ | | 0.8202 | > 1.229 |
| 7th | | ○ | ○ | ○ | | | | | 0.6675 | > 1.146 |
| 8th | | ○ | ● | ○ | | | | | 0.5823 | |

○ : ENGAGED
● : ENGAGED BUT NO TORQUE IS TRANSMITTED
(○): WHEN ENGINE BRAKE IS APPLIED
STEP: GEAR RATIO OF LOWER SPEED/GEAR RATIO OF HIGHER SPEED

FIG. 11 (a)

| PLANETARY GEAR DEVICE | PG0 | PG1 | PG2 | PG3 |
|---|---|---|---|---|
| RATIO OF NUMBER OF TEETH $\lambda = Zs/Zr$ | $\lambda_0$ | $\lambda_1$ | $\lambda_2$ | $\lambda_3$ |
| | 0.440 | 0.440 | 0.394 | 0.394 |

Zs: NUMBER OF TEETH OF SUN GEAR S
Zr: NUMBER OF TEETH OF RING GEAR R

FIG. 11 (b)

| SPEED | ELEMENTS OF TRANSMISSION APPARATUS | | | | | | | GEAR RATIO | STEP |
|---|---|---|---|---|---|---|---|---|---|
| | C-1 | C-2 | B-1 | B-2 | B-3 | B-4 | FC | | |
| P | | | | | | | | | |
| Rev 1 | | | O | | | O | | | |
| Rev 2 | | | | | O | O | | | |
| N | | | | | | | | | |
| 1st | O | | | | | (O) | O | 3.5385 | > 1.717 |
| 2nd | O | | | O | | | | 2.0604 | > 1.324 |
| 3rd | O | | O | | | | | 1.5562 | > 1.311 |
| 4th | O | | | | | O | | 1.1866 | > 1.187 |
| 5th | O | O | | | | | | 1.0000 | > 1.219 |
| 6th | | O | | | | O | | 0.8202 | > 1.229 |
| 7th | | O | O | | | | | 0.6675 | > 1.146 |
| 8th | | O | | O | | | | 0.5823 | |

O : ENGAGED
(O): WHEN ENGINE BRAKE IS APPLIED
STEP: GEAR RATIO OF LOWER SPEED/GEAR RATIO OF HIGHER SPEED

AUTOMATIC TRANSMISSION

TECHNICAL FIELD

The present invention relates to an automatic transmission apparatus, in which an output shaft is connected to an input shaft via a multiple planetary reduction gear device and a multiple planetary transmission gear device, and the speed change is performed at multiple transmission gear ratios by the connection and disconnection operations and the rotation regulation/release of a plurality of clutches and brakes connected to these devices.

BACKGROUND ART

[Patent Document 1] Japanese Unexamined Patent Application Publication No. 2002-213545

In a quest to improve fuel efficiency of a vehicle on which an automatic transmission apparatus is installed, to improve power transmission performance of this automatic transmission apparatus, to obtain smooth transmission, or to improve the comfort of driving the vehicle, for example, it is desired to increase the number of speeds (transmission gear ratios), and evenly distribute the transmission gear ratios over the entire range of the output rotational speed.

In an automatic transmission apparatus of a first aspect according to Patent Document 1, a multiple planetary reduction gear device, in which a sun gear connected to an input shaft is intermeshed with a small diameter pinion, the small diameter pinion is intermeshed with a first ring gear, and a large diameter pinion coaxial and integral with the small diameter pinion intermeshes with a second ring gear, is connected with a Simpson-type multiple planetary transmission gear device having: one single pinion planetary gear device having a ring gear connected to a carrier supporting the above-mentioned pinion; and the other single pinion planetary gear device having a sun gear connected to a sun gear of said one single pinion planetary gear device.

DISCLOSURE OF THE INVENTION

Problems to be Solved by the Invention

In the automatic transmission apparatus according to Cited Document 1, the minimum value of a transmission gear ratio difference between adjacent speeds (e.g., "Step"=Gear Ratio of Adjacent Lower Speed/Gear Ratio of Higher Speed) is relatively small (which is 1.053 in FIG. 2, and 1.077 in FIG. 5, for example), resulting in an unbalanced transmission gear ratio step. The fact that the step is less than 1.1 as described above means that the gear ratio does not change very much before and after transmission; thus, even though transmission is carried out during driving in particular, a driver cannot get a feeling of the transmission (i.e., cannot sense that the transmission is carried out), which might cause discomfort to the driver.

An object of the present invention is to provide an automatic transmission apparatus that keeps a transmission gear ratio step in good balance.

Means for Solving the Problems

An automatic transmission apparatus (109 to 112) according to claim 1 includes:

an input shaft (11) and an output shaft (12);

a first planetary gear device (PG0) having a ring gear (R0) rotationally driven by the input shaft, a pinion intermeshing with the ring gear, a sun gear (S0) intermeshed with the pinion, and a carrier (C0) that supports the pinion;

a second planetary gear device (PG1) having a sun gear (S1) connected to the ring gear (R0) of the first planetary gear device, a pinion intermeshing with the sun gear (S1), a ring gear (R1) intermeshing with the pinion, and a carrier (C1) that supports the pinion and that is connected to the carrier of the first planetary gear device (PG0);

a third planetary gear device (PG2) having a ring gear (R2) connected to the carrier (C1) of the second planetary gear device (PG1), a pinion intermeshing with the ring gear, a sun gear (S2) intermeshing with the pinion, and a carrier (C2) that supports the pinion;

a fourth planetary gear device (PG3) having a sun gear (S3) connected to the sun gear (S2) of the third planetary gear device (PG2), a pinion intermeshing with the sun gear, a ring gear (R3) intermeshing with the pinion and connected to the carrier of the third planetary gear device, and a carrier (C3) that supports the pinion and that is connected to the output shaft (12);

a first clutch (C-1) that selectively connects the sun gear (S2) of the third planetary gear device (PG2) to the input shaft (11);

a second clutch (C-2) that selectively connects the carrier (C2) of the third planetary gear device (PG2) to the input shaft (11);

a first brake (B-1) that selectively regulates the rotation of the ring gear (R0) of the second planetary gear device (PG1);

a second brake (B-2) that selectively regulates the rotation of the ring gear (R2) of the third planetary gear device (PG2);

a third brake (B-3) that selectively regulates the rotation of the sun gear (S0) of the first planetary gear device (PG0); and a fourth brake (B-4) that selectively regulates the rotation of the ring gear (R3) of the fourth planetary gear device (PG3).

It should be noted that, in order to facilitate the understanding, characters, representing corresponding elements or corresponding devices and equipment in embodiments illustrated in the drawings and described later, are added within the parentheses for illustrative and reference purposes. The same goes for the following aspects.

The automatic transmission apparatus (101 to 104) according to claim 2, based on the automatic transmission apparatus according to claim 1, further includes a third clutch (C-3) that selectively connects the ring gear (R0) of the first planetary gear device (PG0) to the input shaft (11).

The automatic transmission apparatus (105 to 108) according to claim 3, based on the automatic transmission apparatus according to claim 1, further includes a third clutch (C-3) that selectively connects the ring gear (R2) of the third planetary gear device (PG2) to the carrier (C1) of the second planetary gear device (PG1).

Effect of the Invention

In the automatic transmission apparatus (109 to 112) according to claim 1, the ratio λ of the numbers of teeth (Number of Teeth of Sun Gear/Number of Teeth of Ring Gear) of the respective planetary gear devices (PG0 to 3) can be set within the range that does not cause any problem to the single pinion planetary gear mechanism, for example, as shown in FIG. 11(*a*) or FIG. 7(*a*), thus making it possible to set the gear ratio (speed ratio) between the output shaft and input shaft of the forward 8-speed automatic transmission apparatus as shown in FIG. 11(*b*) or FIG. 7(*b*). Since the minimum value of a transmission gear ratio difference between adjacent speeds ("Step"=Ratio of Number of Teeth of Adjacent Lower Speed/Ratio of Number of Teeth of Higher Speed) can be relatively increased (to a step value of 1.146 in FIG. 11(b) or FIG. 7(b), for example), the transmission gear ratios of the respective speeds can be relatively evenly distributed over the entire range of the output rotational speed for a large number of speeds.

In the automatic transmission apparatus (101 to 104) according to claim 2, an excessive increase in the speed of the sun gear (S0) of the first planetary gear device (PG0), which occurs when the rotational speed of the input shaft (11) is excessively increased, can be prevented by turning off (disengaging or disconnecting) the third clutch (C-3).

In the embodiments in which no third clutch (C-3) is provided (for example, 109 to 112 in FIG. 8 and FIG. 9), the ring gear R0 of the first planetary gear device (PG0) and the sun gear (S1) of the second planetary gear device (PG1) are always connected to the input shaft (11); therefore, when the rotational speed of the input shaft (11) is excessively increased at the forward first speed "1st", the sun gear (S0) is rotated at an extremely high speed. As shown in FIG. 10, for example, it reaches the speed corresponding to the longitudinal axial position at which an extension of the straight line, connecting the white circular dot on the longitudinal axis of R0 and S1 to the black circular dot at the position of "1st" on the longitudinal line of C0 and C1, intersects the longitudinal line of S0. Accordingly, it is preferable to provide the third clutch (C-3) as defined in claim 2, and to break (disengage) the connection between the input shaft (11), and the ring gear (R1) and sun gear (S1) at "1st". Thus, as shown in the speed line diagram of FIG. 3, for example, an excessive increase in the speed of the sun gear (S0) at "1st" is avoided.

In the automatic transmission apparatus (105 to 108) according to claim 3, an excessive increase in the speed of the sun gear (S0) of the first planetary gear device (PG0), which occurs when the rotational speed of the input shaft (11) is excessively increased, can be prevented by turning off (disconnecting) the third clutch (C-3). Thus, as shown in the speed line diagram of FIG. 6, for example, an excessive increase in the speed of the sun gear (S0) at "1st" is avoided.

The other objects and features of the present invention will be apparent by the description of the following embodiments, which is made with reference to the drawings.

BEST MODE FOR CARRYING OUT THE INVENTION

Embodiment 1

FIG. 1(a) shows a structure of an automatic transmission apparatus 101 according to a first embodiment of the present invention. The first embodiment is one embodiment of claim 2. The automatic transmission apparatus 101 changes the speed of the output rotation of a hydraulic torque converter TC rotationally driven by, for example, an automobile engine located forward thereof, and transmits it to a driving wheel. A pump impeller 7 of the hydraulic torque converter TC is rotationally driven by the engine, which is not shown, so that oil is sent out, and a stator 8 receives a reaction force of the oil, thereby generating a torque in a turbine 9. An input shaft 11 of the automatic transmission apparatus 101 is connected to the turbine 9. LC signifies a lock-up clutch that directly connects the pump impeller 7 with the turbine 9.

The automatic transmission apparatus 101 includes: a forward input shaft 11; a first planetary gear device PG0 and a second planetary gear device PG1, which constitute a multiple planetary reduction gear device; a third planetary gear device PG2 and a fourth planetary gear device PG3, which constitute a multiple planetary transmission gear device; first to third clutches C-1 to C-3; first to fourth brakes B-1 to B-4; a one-way clutch FC; and a rearward output shaft 12, which are sequentially supported on a common axis 13 inside a transmission case attached to a vehicle body.

The first to fourth planetary gear devices PG0 to PG3 each serve as a single pinion planetary gear device. The first planetary gear device PG0 includes: a sun gear S0 rotatable around the common axis 13; a pinion intermeshing with the sun gear S0; a carrier C0 supporting the pinion; and a ring gear R0 with which the pinion is intermeshed. Similarly, the second to fourth planetary gear devices PG1 to PG3 include: sun gears S1 to S3; pinions; carriers C1 to C3; and ring gears R1 to R3, respectively. The relationship between the number Ns of revolutions of the sun gear, the number Nc of revolutions of the carrier and the number Nr of revolutions of the ring gear, and the ratio λ of the numbers of teeth of a planetary gear mechanism is represented by the following equation (1):

$$Nr = (1+\lambda)Nc - \lambda Ns \quad (1)$$

Ratio λ of Numbers of Teeth=Number of Teeth of Sun Gear/Number of Teeth of Ring Gear In the automatic transmission apparatus 101 according to the first embodiment, the first planetary gear device PG0, the second planetary gear device PG1, the third planetary gear device PG2 and the fourth planetary gear device PG3 are provided in this order from the forward input shaft 11 toward the rearward output shaft 12.

The ring gear R0 of the first planetary gear device PG0 is connected to the input shaft 11 via the third clutch C-3, and the rotation of the sun gear S0 is regulated by the third brake B-3. The carrier C0 is connected, rearwardly of the carrier C0 of the first planetary gear device PG0 and forwardly of the carrier C1, with the carrier C1 of the second planetary gear device PG1 from the forward side of the carrier C0 of the first planetary gear device PG0 through the inner diameter side of the sun gear S0 of the first planetary gear device PG0.

The ring gear R0 of the first planetary gear device PG0 is connected with the sun gear S1 of the second planetary gear device PG1 from the forward side of the ring gear R0 through the inner diameter side of the sun gear S0. The rotation of the ring gear R1 of the second planetary gear device PG1 is regulated by the first brake B-1. The carrier C1 is connected, from the rearward side thereof, with the ring gear R2 of the third planetary gear device PG2 at the outer diameter side of the ring gear R1 and rearwardly of the ring gear R1.

The sun gear S2 of the third planetary gear device PG2 is connected to the input shaft 11 via the first clutch C-1. The carrier C2 is connected to the input shaft 11 via the second clutch C-2, and the carrier C2 and ring gear R3 are connected to the transmission case via the one-way clutch FC, thus regulating reverse rotation. Furthermore, the rotation of the ring gear R3 and carrier C2 is regulated by the fourth brake B-4. The sun gears S2 and S3 of the third and fourth planetary gear devices PG2 and PG3 are connected to each other, and are further connected to the input shaft 11 via the first clutch C-1. The carrier C3 of the fourth planetary gear device PG3 is connected to the output shaft 12.

The one-way clutch FC serves to prevent the reverse rotation of the carrier C2 of the third planetary gear device PG2 and the ring gear R3 of the fourth planetary gear device PG3, and operates at "1st" to fix the carrier C2 of PG2 and the ring gear R3 of PG3.

The automatic transmission apparatus 101 structured as described above selectively operates (connects) the first to third clutches C-1 to C-3, and selectively operates the first to fourth brakes B-1 to B-4 and the one-way clutch FC (carries out rotation regulation) to regulate the rotation of the structural elements of the first to fourth planetary gear devices PG0 to PG3, thereby making it possible to realize forward 8-speed and reverse 2-speed gear ratios.

FIG. 7(a) shows the ratios $\lambda_0$ to $\lambda_3$ of the numbers of teeth of the respective first to fourth planetary gear devices PG0 to PG3, and FIG. 7(b) shows the operational state table and gear ratios of the automatic transmission apparatus 101. In this operational state table, white circles placed in columns of the respective clutches, brakes and the like, associated with the respective speeds, indicates that the clutch is in a connected (engaged) state, or the brake or one-way clutch FC is in a rotation regulating (braking, or stopping and restraining) state. Each black circle indicates that the clutch is in a connected state or the brake is in a rotation regulating state, but smooth mechanical shifting of the speeds is enabled, and the speeds are shifted so as not to cause a transmission shock even in a simple transmission control, exerting no influence on the setting of the speeds.

FIG. 7(b) further shows the gear ratios of the respective speeds of the automatic transmission apparatus 101 (Number of Revolutions of Input Shaft 11/Number of Revolutions of Output Shaft 12), and "step" values when the speed is increased to the next level. Each "step" value indicates the ratio of the gear ratios between adjacent speeds (Gear Ratio of Lower Speed/Gear Ratio of Higher Speed). In the present embodiment, the minimum "step" value is 1.146, which is greater than a conventional minimum value (which is 1.077 between "6th" and "7th" in FIG. 5 of Patent Document 1, for example), and the transmission gear ratios of the respective speeds are relatively evenly (equally) distributed over the entire range of the forward 8-speed output rotational speed (for example, the speed values of the respective speeds in the output C3 in FIG. 3).

As shown in FIG. 7(b), when the first to fourth brakes B-1 to B-4 and one-way clutch FC are selectively operated and the first to third clutches C-1 to C-3 are selectively connected, the speed ratios of the respective structural elements of the first to fourth planetary gear devices PG0 to PG3 are given in a speed line diagram shown in FIG. 3.

Next, the operations of the respective speeds will be described. Refer to the operational state table in FIG. 7(b) and the speed line diagram in FIG. 3. In the case of the forward first speed "1st", the first clutch C-1 is operated (connected or engaged), and the sun gear S3 of the fourth planetary gear device PG3 is rotationally driven due to the rotation of the input shaft 11. Since the one-way clutch FC is operated to fix R3, the carrier C3 of the fourth planetary gear device PG3 is driven in a forward direction with a first speed gear ratio of 3.5385. Thus, the output shaft 12 connected to the carrier C3 is rotated.

In the case of the forward second speed "2nd", the first clutch C-1 is operated, and the second brake B-2 is operated (so as to prevent rotation or regulate rotation); thus, the sun gears S2 and S3 of the second and fourth planetary gear devices PG2 and PG3 are rotationally driven due to the rotation of the input shaft 11, and the second brake B-2 stops and restrains the ring gear R2 of the third planetary gear device PG2 and the carriers C1 and C0. Since the sun gear S2 of the third planetary gear device PG2 rotationally drives the pinion, and the ring gear R2 is stopped and restrained, the carrier C2 is rotated to rotationally drive the ring gear R3 of the fourth planetary gear device PG3. On the other hand, the sun gear S3 of the fourth planetary gear device PG3 rotationally drives the pinion; however, since the ring gear R3 is rotationally driven by the carrier C2, the carrier C3 is driven in a forward direction with a second speed gear ratio of 2.0604 in accordance with the rotation of the ring gear R3 and sun gear S3.

In the case of the forward third speed "3rd", the first and third clutches C-1 and C-3 and the first brake B-1 are operated, the sun gears S1, S2 and S3 and the ring gear R0 are rotationally driven due to the rotation of the input shaft 1, and the ring gear R1 is stopped and restrained by the first brake B-1. Since the ring gear R1 is stopped and restrained, the sun gear S1 rotationally drives the carriers C1 and C0 and the ring gear R2. On the other hand, due to the rotation of the sun gear S2, the carrier C2 is rotated to rotationally drive the ring gear R3. The sun gear S3 of the fourth planetary gear device PG3 rotationally drives the pinion; however, since the ring gear R3 is rotationally driven by the carrier C2, the carrier C3 is driven in a forward direction with a third speed gear ratio of 1.5562 in accordance with the rotation of the ring gear R3 and sun gear S3.

In the case of the forward fourth speed "4th", the first and third clutches C-1 and C-3 and the third brake B-3 are operated, the ring gear R0 and the sun gears S1, S2 and S3 are rotationally driven due to the rotation of the input shaft 11, and the sun gear S0 is stopped and restrained by the third brake B-3. Since the sun gear S0 is stopped and restrained, the carriers C0 and C1 and the ring gear R2 are rotationally driven due to the rotation of the ring gear R0. Since R2 is rotated, the carrier C2 is rotated in accordance with the rotation of R2 and the rotation of the sun gear S2, thereby rotationally driving the ring gear R3. The sun gear S3 of the fourth planetary gear device PG3 rotationally drives the pinion; however, since the ring gear R3 is rotationally driven by the carrier C2, the carrier C3 is driven in a forward direction with a fourth speed gear ratio of 1.1866 in accordance with the rotation of the ring gear R3 and sun gear S3.

In the case of the forward fifth speed "5th", the first and second clutches C-1 and C-2 are operated, and the sun gears S2 and S3 and carrier C2 are rotationally driven due to the rotation of the input shaft 11. Due to the rotation of the carrier C2, the ring gear R3 is rotated. The sun gear S3 rotationally drives the pinion; however, since the ring gear R3 is rotationally driven, the carrier C3 is driven in a forward direction with a fifth speed gear ratio of 1.0000 in accordance with the rotation of the ring gear R3 and sun gear S3.

In the case of the forward sixth speed "6th", the second and third clutches C-2 and C-3 and the third brake B-3 are operated, the carrier C2, the ring gear R0 and the sun gear S1 are rotationally driven due to the rotation of the input shaft 11, and the sun gear S0 is stopped and restrained. Due to the rotation of the ring gear R0, the carriers C0 and C1 and the ring gear R2 are rotated, and due to the rotation of R2 and the carrier C2, the ring gear R3 is rotationally driven and the sun gear S2 is rotationally driven, thereby rotating the sun gear S3 connected to the sun gear S2. Due to the rotation of the sun gear S3 and the rotation of the ring gear R3, the carrier C3 is driven in a forward direction with a sixth speed gear ratio of 0.8202.

In the case of the forward seventh speed "7th", the second and third clutches C-2 and C-3 and the first brake B-1 are operated, the carrier C2, the ring gear R0 and the sun gear S1 are rotationally driven due to the rotation of the input shaft 11, and the ring gear R1 is stopped and restrained. The carriers C0 and C1 and the ring gear R2 are rotationally driven by the sun gear S1, and due to the rotation of the carrier C2 and ring gear R2, the ring gear R3 is rotationally driven and the sun gear S2 is rotationally driven. Due to the rotation of the sun gear S2, the sun gear S3 connected thereto is rotated. Due to the rotation of the sun gear S3 and the rotation of the ring gear R3, the carrier C3 is driven in a forward direction with a seventh speed gear ratio of 0.6675.

In the case of the forward eighth speed "8th", the second clutch C-2 and the second brake B-2 are operated, the carrier C2 is rotationally driven due to the rotation of the input shaft 11, and the ring gear R2 is stopped and restrained. Since the carrier C2 is rotated and the ring gear R2 is stopped and restrained, the sun gears S2 and S3 are rotationally driven by the carrier C2, and the ring gear R3 is rotationally driven. Due to the rotation of the sun gear S3 and ring gear R3, the carrier C3 is driven in a forward direction with an eighth speed gear ratio of 0.5823.

In the case of the reverse first speed "Rev 1", the third clutch C-3, the first brake B-1 and the fourth brake B-4 are operated, the ring gear R0 and the sun gear S1 are rotationally driven due to the rotation of the input shaft 11, and the ring gears R1 and R3 are stopped and restrained. Since the carriers C0 and C1 and the ring gear R2 are rotationally driven due to the rotation of the sun gear S1, and the ring gear R3 is stopped and restrained, the rotation of the carrier C2 is prevented, the sun gear S2 is rotationally driven due to the rotation of the ring gear R2, and the sun gear S3 connected to the sun gear S2 rotationally drives the carrier C3.

In the case of the reverse second speed "Rev 2", the third clutch C-3, the third brake B-3 and the fourth brake B-4 are operated, the ring gear R0 and the sun gear S1 are rotationally driven due to the rotation of the input shaft 11, and the sun gear S0 and the ring gear R3 are stopped and restrained. Since the carriers C0 and C1 and the ring gear R2 are rotationally driven due to the rotation of the ring gear R0, and the ring gear R3 is stopped and restrained, the rotation of the carrier C2 is prevented, the sun gear S2 is rotationally driven due to the rotation of the ring gear R2, and the sun gear S3 connected to the sun gear S2 rotationally drives the carrier C3.

Embodiment 2

FIG. 1(b) shows an automatic transmission apparatus 102 according to a second embodiment. The second embodiment is one embodiment of claim 2. Similarly to the first embodiment, the automatic transmission apparatus 102 according to the second embodiment is provided with the single pinion type first planetary gear device PG0, second planetary gear device PG1, third planetary gear device PG2 and fourth planetary gear device PG3 in this order from the forward input shaft 11 toward the rearward output shaft 12. However, the ring gear R0 of the first-planetary gear device PG0 is connected, from its rearward side, to the third clutch C-3 through the inner diameter side of the sun gear S0. The sun gear S1 of the second planetary gear device PG1 is connected, at its forward side and rearwardly of the sun gear S0, to the ring gear R0. The carrier C0 of the first planetary gear device PG0 is connected, rearwardly of C0 and forwardly of C1, with the carrier C1 of the second planetary gear device PG1 from the forward side of C0 through the outer diameter side of the ring gear R0. The other structures and operations of the automatic transmission apparatus 102 according to the second embodiment are similar to those of the apparatus according to the foregoing first embodiment.

Embodiment 3

FIG. 2(a) shows an automatic transmission apparatus 103 according to a third embodiment. The third embodiment is one embodiment of claim 2. The automatic transmission apparatus 103 according to the third embodiment is provided with the second planetary gear device PG1, the first planetary gear device PG0, the third planetary gear device PG2 and the fourth planetary gear device PG3 in this order from the forward input shaft 11 toward the rearward output shaft 12. The ring gear R0 of the first planetary gear device PG0 is connected, from its rearward side, to the third clutch C-3 through the inner diameter side of the sun gears S0 and S1. The sun gear S1 is connected, at its inner diameter side, to the ring gear R0. The carrier C0 of the first planetary gear device PG0 is connected, rearwardly of C0, with the carrier C1 of the second planetary gear device PG1 from the rearward side of C1 through the outer diameter side of the ring gear R0. The carrier C0 of the first planetary gear device PG0 is connected, rearwardly of the ring gear R0, with the ring gear R2 of the third planetary gear device PG2 from the forward side of the carrier C0 of the first planetary gear device PG0 through the inner diameter side of the sun gear S0. The other structures and operations of the automatic transmission apparatus 103 according to the third embodiment are similar to those of the apparatus according to the foregoing first embodiment.

Embodiment 4

FIG. 2(b) shows an automatic transmission apparatus 104 according to a fourth embodiment. The fourth embodiment is one embodiment of claim 2. The second planetary gear device PG1, the first planetary gear device PG0, the third planetary gear device PG2 and the fourth planetary gear device PG3 are provided in this order. The ring gear R0 of the first planetary gear device PG0 is connected, at its rearward side, to the third clutch C-3 through the inner diameter side of the sun gears S0 and S1. The sun gear S1 is connected, at its inner diameter side, to the ring gear R0. The carrier C0 of the first planetary gear device PG0 is connected, rearwardly of C0, with the carrier C1 of the second planetary gear device PG1 from the rearward side of C1 through the inner diameter side of the sun gear S0. The carrier C0 of the first planetary gear device PG0 is connected, rearwardly of the ring gear R0, with the ring gear R2 of the third planetary gear device PG2 from the forward side of the carrier C0 of the first planetary gear device PG0 through the outer diameter side of the ring gear R0. The other structures and operations of the automatic transmission apparatus 104 according to the fourth embodiment are similar to those of the apparatus according to the foregoing first embodiment.

Embodiment 5

FIG. 4(a) shows an automatic transmission apparatus 105 according to a fifth embodiment. The fifth embodiment is one embodiment of claim 3. In the automatic transmission apparatus 105 according to the fifth embodiment, the third clutch C-3 of the automatic transmission apparatus 101 according to the first embodiment shown in FIG. 1(a) is interposed between the ring gear R1 of the second planetary gear device PG1 and the ring gear R2 of the third planetary gear device PG2, and the sun gear S1 of the second planetary gear device PG1 is (directly) connected to the input shaft 11. The ratios of the numbers of teeth of the first to fourth planetary gear devices PG0 to PG3, and the operational state table and gear ratios of the automatic transmission apparatus 105 according to the fifth embodiment are similar to those of the automatic transmission apparatus 101 according to the first embodiment, which are shown in FIG. 7. As a speed line diagram, one shown in FIG. 6 is provided.

Next, the operations of the respective speeds of the automatic transmission apparatus 105 will be described. Refer to the operational state table in FIG. 7(b) and the speed line diagram in FIG. 6. In both of the cases of the forward first speed "1st" and the forward second speed "2nd", the ring gear R0 and the sun gear S1 are rotationally driven due to the rotation of the input shaft 11; however, since the third clutch C-3 is not operated, there is no connection between the carriers C0 and C1, and the ring gear R2, and the rotation of the ring gear R0 and sun gear S1 exerts no influence on the rotational driving of the output shaft 12, thus providing the operations substantially similar to those of the automatic transmission apparatus 101 according to the first embodiment.

In the case of the forward third speed "3rd", since the third clutch C-3 is operated, the connection of the mechanical elements in the automatic transmission apparatus 105 becomes similar to that of the mechanical elements in the automatic transmission apparatus 101 according to the first embodiment in the case of the forward third speed "3rd". Accordingly, the operations in the case of the forward third speed "3rd" are also substantially similar to those of the automatic transmission apparatus 101 according to the first embodiment. Similarly, the operations in the case of the forward fourth speed "4th" are also substantially similar to those of the automatic transmission apparatus 101 according to the first embodiment.

In the case of the forward fifth speed "5th", since the first and second clutches C-1 and C-2 are operated, the sun gear S1 and the ring gear R0 are rotated; in addition, the sun gears S2 and S3 and the carrier C2 are rotated. Even if the sun gear S1 is rotationally driven by the input shaft, the sun gear S0 and the ring gear R1 are disconnected (allowed to spin); therefore, the rotation of the sun gear S1 exerts no influence on the rotational driving of the output shaft 12, and even when the sun gear S1 and the ring gear R0 are rotated, the carriers C0 and C1 and the ring gear R2 are not rotationally driven by the first and second planetary gear devices PG0 and PG1. Due to the rotation of the sun gear 3 and that of the carrier C2, the sun gear S3 and the ring gear R3 are rotationally driven, thereby rotationally driving the carrier C3.

In the case of the forward sixth speed "6th", the second and third clutches C-2 and C-3 and the third brake B-3 are operated, and the connection of the mechanical elements in the automatic transmission apparatus 105 becomes similar to that of the mechanical elements in the automatic transmission apparatus 101 according to the first embodiment in the case of the forward sixth speed "6th". Accordingly, the operations in the case of the forward sixth speed "6th" are also substantially similar to those of the automatic transmission apparatus 101 according to the first embodiment. Similarly, the operations in the case of the forward seventh speed "4th" are also substantially similar to those of the automatic transmission apparatus 101 according to the first embodiment.

In the case of the forward eighth speed "8th", the second clutch C-2 and the second brake B-2 are operated, and the sun gear S1 and the ring gear R0 are rotationally driven; in addition, the carrier C2 is rotationally driven, and the ring gear R2 is stopped and restrained. Since the third clutch C-3 is disengaged, and the connection between the carrier C1 and the ring gear R2 is broken, the operations of the first and second planetary gear devices PG0 and PG1 exert no influence on the ring gear R2. Since the ring gear R2 is stopped and restrained, and the carrier C2 is rotationally driven, the ring gear R3 and the sun gear S3 are rotationally driven by the carrier C2 and the sun gear S2, respectively. The carrier C3 is rotationally driven in accordance with the rotation of the ring gear R3 and the rotation of the sun gear S3.

Also in the case of the reverse first speed "Rev 1" and in the case of the reverse second speed "Rev 2", the third clutch C-3 is operated, and the connection of the mechanical elements in the automatic transmission apparatus 105 becomes similar to that of the mechanical elements in the automatic transmission apparatus 101 according to the first embodiment in the case of the reverse first speed "Rev 1" and in the case of the reverse second speed "Rev 2". Accordingly, the structural operations are substantially similar to the operations of the automatic transmission apparatus 101 according to the first embodiment.

Embodiment 6

FIG. 4(b) shows an automatic transmission apparatus 106 according to a sixth embodiment. The sixth embodiment is one embodiment of claim 3. In the automatic transmission apparatus 106 according to the sixth embodiment, the third clutch C-3 of the automatic transmission apparatus 102 according to the second embodiment shown in FIG. 1(b) is interposed between the ring gear R1 of the second planetary gear device PG1 and the ring gear R2 of the third planetary gear device PG2, and the sun gear S1 of the second planetary gear device PG1 is (directly) connected to the input shaft 11. The operations of the automatic transmission apparatus 106 according to the sixth embodiment are similar to those of the apparatus according to the foregoing fifth embodiment.

Embodiment 7

FIG. 5(a) shows an automatic transmission apparatus 107 according to a seventh embodiment. The seventh embodiment is one embodiment of claim 3. In the automatic transmission apparatus 107 according to the seventh embodiment, the third clutch C-3 of the automatic transmission apparatus 103 according to the third embodiment shown in FIG. 2(a) is interposed between the ring gear R1 of the second planetary gear device PG1 and the ring gear R2 of the third planetary gear device PG2, and the sun gear S1 of the second planetary gear device PG1 is (directly) connected to the input shaft 11. The operations of the automatic transmission apparatus 107 according to the seventh embodiment are similar to those of the apparatus according to the foregoing fifth embodiment.

Embodiment 8

FIG. 5(b) shows an automatic transmission apparatus 108 according to an eighth embodiment. The eighth embodiment is one embodiment of claim 3. In the automatic transmission apparatus 108 according to the eighth embodiment, the third clutch C-3 of the automatic transmission apparatus 104 according to the fourth embodiment shown in FIG. 2(b) is interposed between the ring gear R1 of the second planetary gear device PG1 and the ring gear R2 of the third planetary gear device PG2, and the sun gear S1 of the second planetary gear device PG1 is (directly) connected to the input shaft 11. The operations of the automatic transmission apparatus 108 according to the eighth embodiment are similar to those of the apparatus according to the foregoing fifth embodiment.

Embodiment 9

FIG. 8(a) shows an automatic transmission apparatus 109 according to a ninth embodiment. The ninth embodiment is one embodiment of claim 1. In the automatic transmission apparatus 109 according to the ninth embodiment, the third clutch C-3 of the automatic transmission apparatus 101 according to the first embodiment shown in FIG. 1(a) is omitted, and the ring gear R0 of the first planetary gear device PG0 and the sun gear S1 of the second planetary gear device PG1 are (directly) connected to the input shaft 11. In FIG. 11, there are shown the ratios of the numbers of teeth of the first to fourth planetary gear devices PG0 to PG3, and the operational state table and gear ratios of the automatic transmission apparatus 109 according to the ninth embodiment, and in FIG. 10, a speed line diagram thereof is shown. The ratios of the numbers of teeth and the gear ratios of the first to fourth planetary gear devices PG0 to PG3 of the automatic transmission apparatus 109 according to the ninth embodiment are similar to those of the automatic transmission apparatus 101 according to the first embodiment shown in FIG. 7. The operational state table shown in FIG. 11(b) is provided by deleting the column of the third clutch C-3 from the table according to the first embodiment shown in FIG. 7.

Next, the operations of the respective speeds of the automatic transmission apparatus 109 will be described. Refer to the operational state table in FIG. 11(b) and the speed line diagram in FIG. 10. In the case of the forward first speed "1st", the sun gear S1 and the ring gear R0 are rotationally driven due to the rotation of the input shaft 11, and the first clutch C-1 is operated; thus, the sun gears S2 and S3 are rotationally driven. The ring gear R0 and the sun gear S1 are rotated because they are directly connected to the input shaft 11; however, since the sun gear S0 and the ring gear R1 are disengaged, the first and second planetary gear devices PG0 and PG1 do not rotationally drive the carriers C0 and C1 and the ring gear R2. Since the one-way clutch FC is operated to stop and restrain (fix) R3, the carrier C3 of the fourth planetary gear device PG3 is rotationally driven by the sun gear S3.

In the case of the forward second speed "2nd", since the first clutch C-1 is operated, the sun gears S2 and S3 are rotationally driven. Since the second brake B-2 stops and restrains the ring gear R2, the sun gears S2 and S3 are rotationally driven due to the rotation of the input shaft 11, and the carrier C2 is rotated by the sun gear S2, thereby rotationally driving the ring gear R3. The carrier C3 is rotated in accordance with the rotational speeds of the ring gear R3 and the sun gear S3.

In the case of the forward third speed "3rd", the sun gear S1 and the ring gear R0 are rotationally driven due to the rotation of the input shaft 11, and the first clutch C-1 is operated, thus rotationally driving the sun gears S2 and S3. Since the first brake B-1 stops and restrains the ring gear R1, the carriers C0 and C1 and the ring gear R2 are rotationally driven due to the rotation of the sun gear S1. On the other hand, due to the rotation of the input shaft 11, the sun gears S2 and S3 are rotationally driven, and the carrier C2 is rotated at a speed in accordance with the rotation of the ring gear R2 and sun gear S2, thereby rotationally driving the ring gear R3. The carrier C3 is rotated in accordance with the rotational speeds of the ring gear R3 and the sun gear S3.

In the case of the forward fourth speed "4th", the sun gear S1 and the ring gear R0 are rotationally driven due to the rotation of the input shaft 11, and the first clutch C-1 is operated, thus rotationally driving the sun gears S2 and S3. Since the sun gear S0 is stopped and restrained by the third brake B-3, the carriers C0 and C1 and the ring gear R2 are rotationally driven due to the rotation of the ring gear R0. The sun gear S1 is also rotated; however, since the ring gear R1 is disengaged, the sun gear S1 does not rotationally drive the carriers C0 and C1 and the ring gear R2. On the other hand, due to the rotation of the input shaft 11, the sun gears S2 and S3 are rotationally driven, and the carrier C2 is rotated at a speed in accordance with the rotation of the ring gear R2 and sun gear S2, thereby rotationally driving the ring gear R3. The carrier C3 is rotated in accordance with the rotational speeds of the ring gear R3 and the sun gear S3.

In the case of the forward fifth speed "5th", the ring gear R0 and the sun gear S1 are rotationally driven by the input shaft 11; however, since the sun gear S0 and the ring gear R1 are disengaged, the carriers C0 and C1 and the ring gear R2 are not rotationally driven by the ring gear R0 and the sun gear S1. In other words, the first and second planetary gear devices PG0 and PG1 are not involved in the rotational driving of the ring gear R2. Due to the operations of the first and second clutches C-1 and C-2, the sun gears S2 and S3 and the carrier C2 are rotationally driven by the rotation of the input shaft 11. Due to the rotation of the carrier C2, the ring gear R3 is rotated. The sun gear S3 rotationally drives the pinion; however, since the ring gear R3 is rotationally driven, the carrier C3 is rotationally driven due to the rotation of the sun gear S3 and ring gear R3.

In the case of the forward sixth speed "6th", the ring gear R0 and the sun gear S1 are rotationally driven by the input shaft 11. The first clutch C-1 is not operated but the second clutch C-2 is operated, thus allowing the carrier C2 to be rotationally driven by the input shaft 11. Since the third brake is operated to stop and restrain the sun gear S0, the ring gear R0 is rotationally driven by the input shaft 11, thereby rotationally driving the carriers C0 and C1 and the ring gear R2. Thus, the sun gears S2 and S3 are rotated to rotationally drive the carrier C2, and the carrier C2 rotationally drives the ring gear R3. The carrier C3 is rotated at a rotational speed in accordance with that of the ring gear R3 and that of the sun gear S3.

In the case of the forward seventh speed "7th", the sun gear S1 and the ring gear R0 are rotationally driven due to the rotation of the input shaft 11, and the ring gear R1 is stopped and restrained due to the operation of the first brake B-1; thus, the carriers C1 and C0 and the ring gear R2 are rotationally driven by the sun gear S1. The ring gear R0 is rotationally driven by the input shaft 11; however, since the sun gear S0 is disengaged, the ring gear R0 does not rotationally drive the carriers C0 and C1 and the ring gear R2. The first clutch C-1 is not operated but the second clutch C-2 is operated, thereby allowing the carrier C2 to be rotationally driven by the input shaft 11. Thus, the sun gears S2 and S3 are rotated at speeds in accordance with the rotational speeds of the ring gear R2 and carrier C2. Due to the rotation of the carrier C2, the ring gear R3 is rotationally driven. Thus, the carrier C3 is rotationally driven at a speed in accordance with the rotational speeds of the sun gear S3 and ring gear R3.

In the case of the forward eighth speed "8th", the second clutch C-2 and the second brake B-2 are operated, the carrier C2 is rotationally driven due to the rotation of the input shaft 11, and the ring gear R2 and the carriers C1 and C0 are stopped and restrained. Since the carrier C2 is rotated and the ring gear R2 is stopped and restrained, the sun gears S2 and S3 are rotationally driven and the ring gear R3 is rotationally driven by the carrier C2. Due to the rotation of the sun gear S3 and ring gear R3, the carrier C3 is rotationally driven.

In the case of the reverse first speed "Rev 1", the first and fourth brakes B-1 and B-4 stop and restrain the ring gears R1 and R3. The ring gear R0 and the sun gear S1 are rotationally driven by the input shaft 11, and the sun gear S1 rotationally drives the carriers C1 and C0, and R2. Due to the rotation of the ring gear R2, the sun gears S2 and S3 are rotated, and the sun gear S3 rotationally drives the carrier C3.

In the case of the reverse second speed "Rev 2", the third and fourth brakes B-3 and B-4 stop and restrain the sun gear S0 and the ring gear R3. The ring gear R0 and the sun gear S1 are rotationally driven by the input shaft 11, and the ring gear R0 rotationally drives the carriers C0 and C1 and the ring gear R2. Since the sun gears S2 and S3 are rotated due to the rotation of the ring gear R2, and the ring gear R3 is stopped and restrained, the sun gear S3 rotationally drives the carrier C3.

Embodiment 10

FIG. 8(b) shows an automatic transmission apparatus 110 according to a tenth embodiment. The tenth embodiment is one embodiment of claim 1. In the automatic transmission apparatus 109 according to the tenth embodiment, the third clutch C-3 of the automatic transmission apparatus 102 according to the second embodiment shown in FIG. 1(b) is omitted, and the ring gear R0 of the first planetary gear device PG0 and the sun gear S1 of the second planetary gear device PG1 are (directly) connected to the input shaft 11. The operations of the automatic transmission apparatus 110 according to the tenth embodiment are similar to those of the automatic transmission apparatus 109 according to the foregoing ninth embodiment.

Embodiment 11

FIG. 9(a) shows an automatic transmission apparatus 111 according to an eleventh embodiment. The eleventh embodiment is one embodiment of claim 1. In the automatic transmission apparatus 111 according to the eleventh embodiment, the third clutch C-3 of the automatic transmission apparatus 103 according to the third embodiment shown in FIG. 2(a) is omitted, and the ring gear R0 of the first planetary gear device PG0 and the sun gear S1 of the second planetary gear device PG1 are (directly) connected to the input shaft 11. The operations of the automatic transmission apparatus 111 according to the eleventh embodiment are similar to those of the automatic transmission apparatus 109 according to the foregoing ninth embodiment.

Embodiment 12

FIG. 9(b) shows an automatic transmission apparatus 112 according to a twelfth embodiment. The twelfth embodiment is one embodiment of claim 1. In the automatic transmission apparatus 112 according to the twelfth embodiment, the third clutch C-3 of the automatic transmission apparatus 104 according to the fourth embodiment shown in FIG. 2(b) is omitted, and the ring gear R0 of the first planetary gear device PG0 and the sun gear S1 of the second planetary gear device PG1 are (directly) connected to the input shaft 11. The operations of the automatic transmission apparatus 112 according to the twelfth embodiment are similar to those of the automatic transmission apparatus 109 according to the foregoing ninth embodiment.

BRIEF DESCRIPTION OF THE DRAWINGS

FIG. 7 (a) is a diagram showing the ratios of the numbers of teeth of first to fourth planetary gear devices PG0 to PG3, which is common to the automatic transmission apparatuses 101 to 108 according to the first to eighth embodiments shown in FIG. 1, FIG. 2, FIG. 4 and FIG. 5, while (b) is a diagram showing an operational state table and gear ratios, which is common to the automatic transmission apparatuses 101 to 108 according to the first to eighth embodiments.

FIG. 11 (a) is a diagram showing the ratios of the numbers of teeth of the first to fourth planetary gear devices PG0 to PG3, which is common to the automatic transmission apparatuses 109 to 112 according to the ninth to twelfth embodiments shown in FIG. 8 and FIG. 9, while (b) is a diagram showing an operational state table and gear ratios, which is common to the automatic transmission apparatuses 109 to 112 according to the ninth to twelfth embodiments.

DESCRIPTION OF THE REFERENCE CHARACTERS

Figure 1:
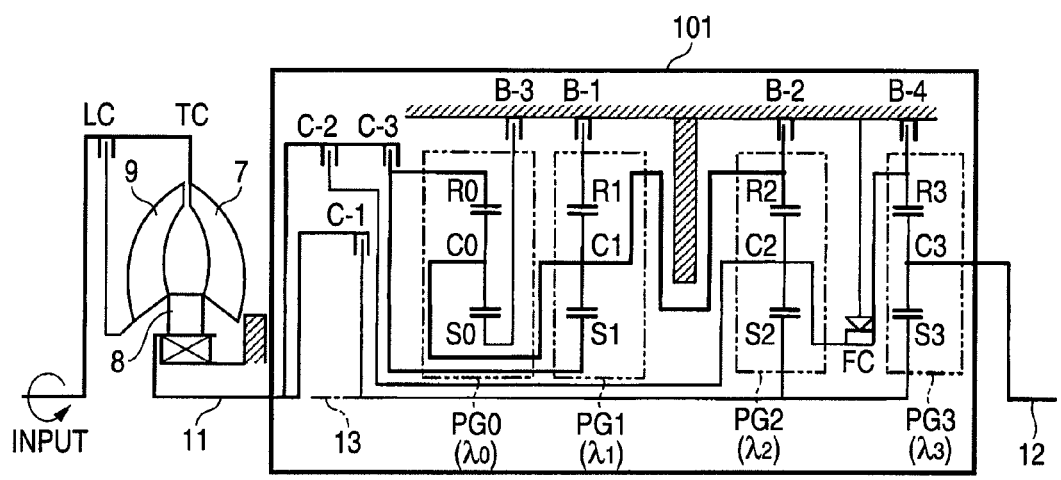
FIGS. 1 (a) and (b) are block diagrams showing schematic structures according to a first embodiment and a second embodiment of the present invention, respectively.
Figure 1:
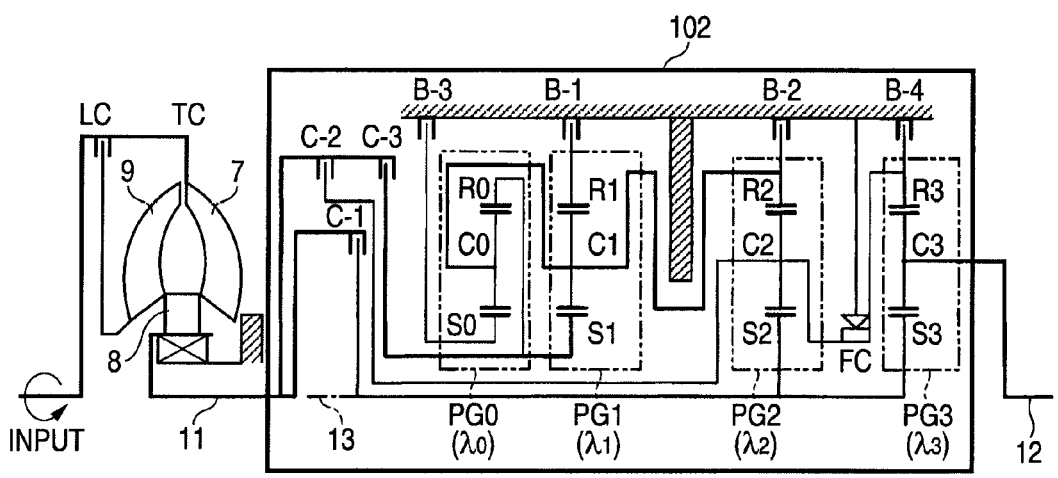
Figure 2:
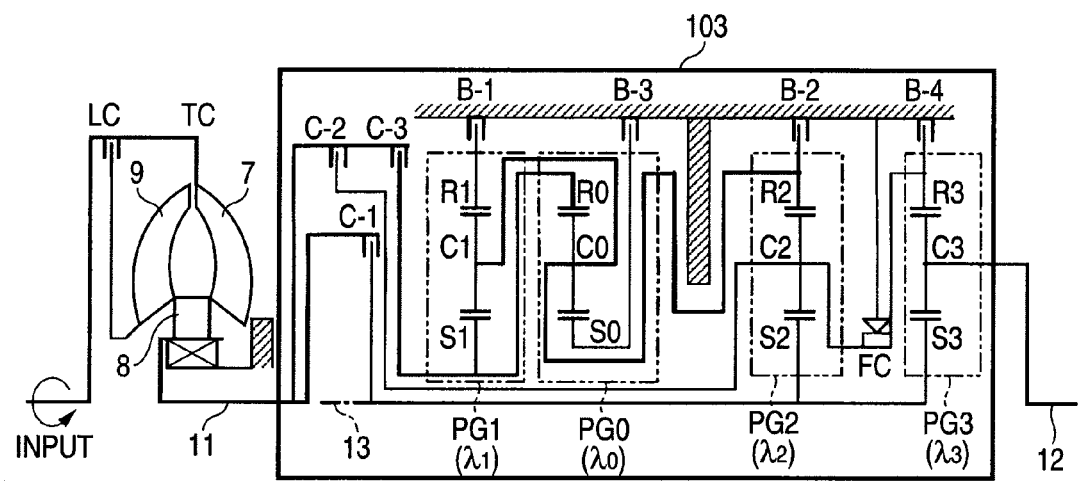
FIGS. 2 (a) and (b) are block diagrams showing schematic structures according to a third embodiment and a fourth embodiment of the present invention, respectively.
Figure 2:
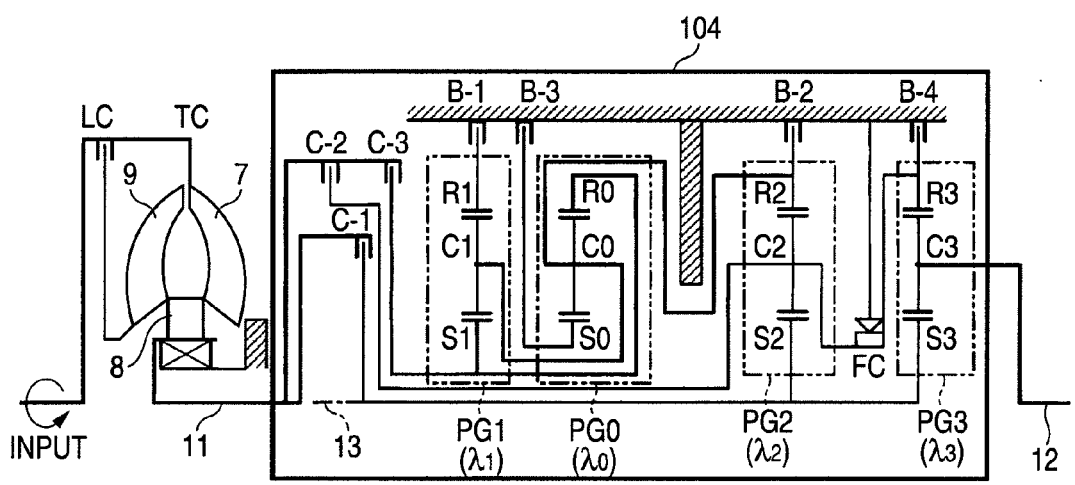
Figure 3:
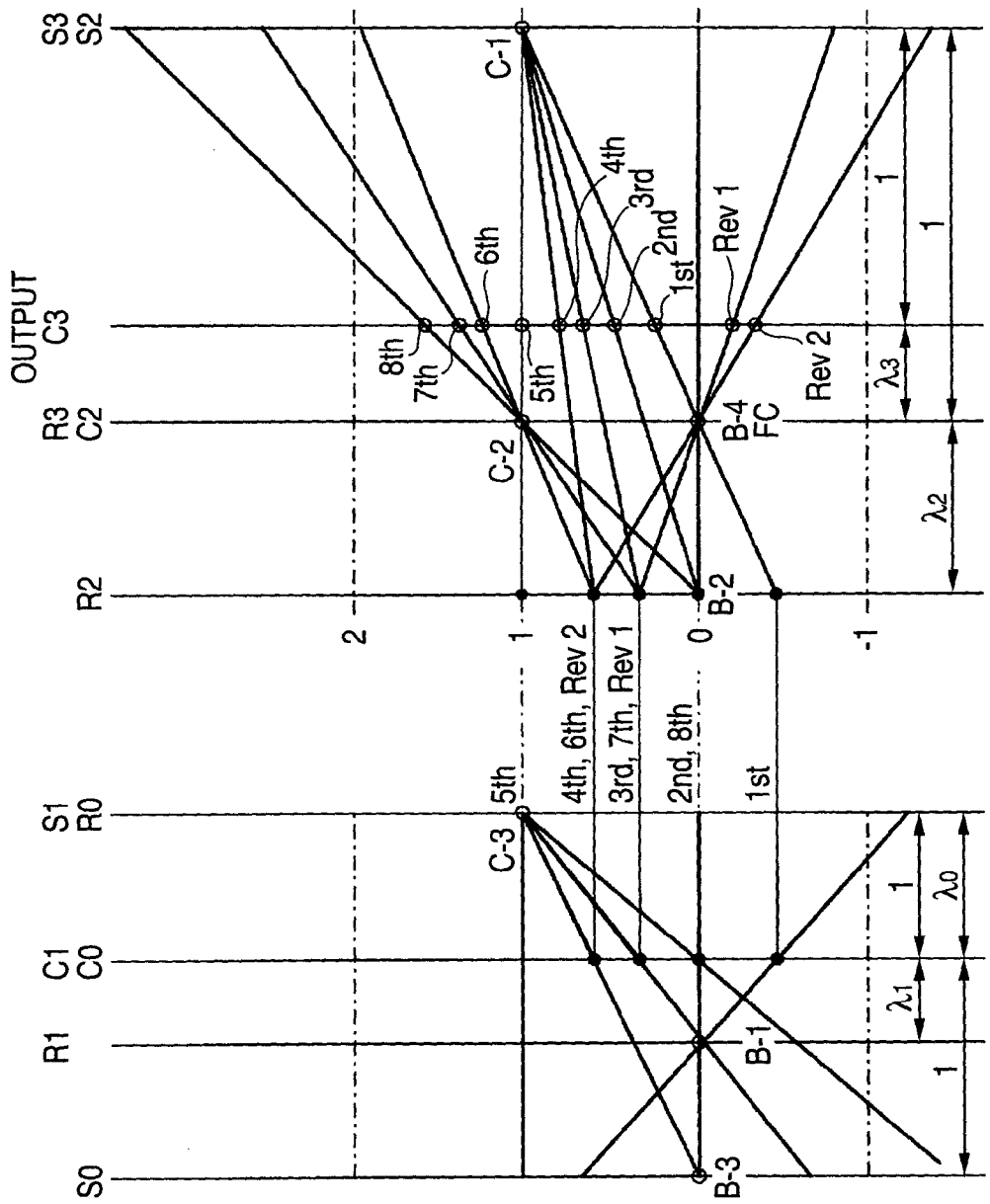
FIG. 3 A graph showing a speed line diagram common to automatic transmission apparatuses 101 to 104 shown in FIG. 1 and FIG. 2.
Figure 4:
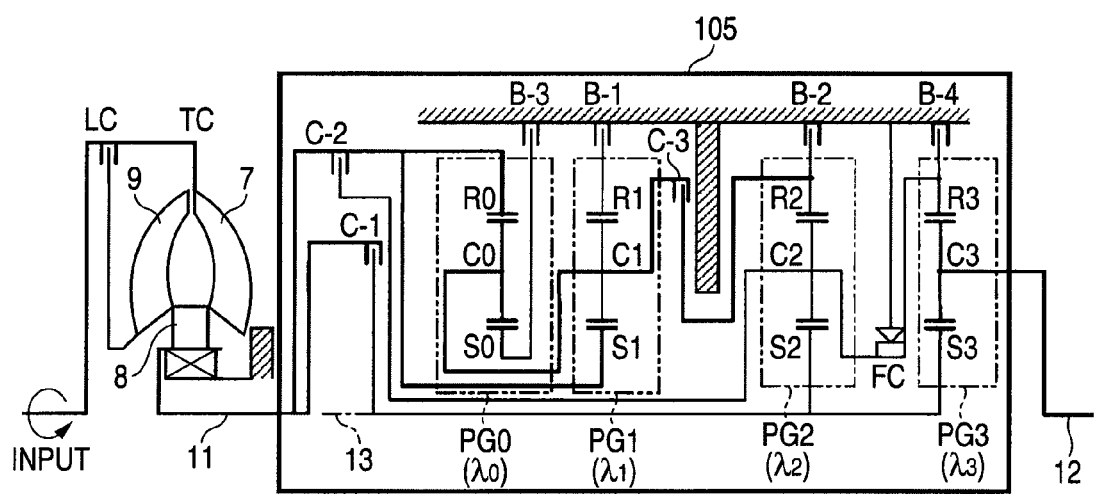
FIGS. 4 (a) and (b) are block diagrams showing schematic structures according to a fifth embodiment and a sixth embodiment of the present invention, respectively.
Figure 4:
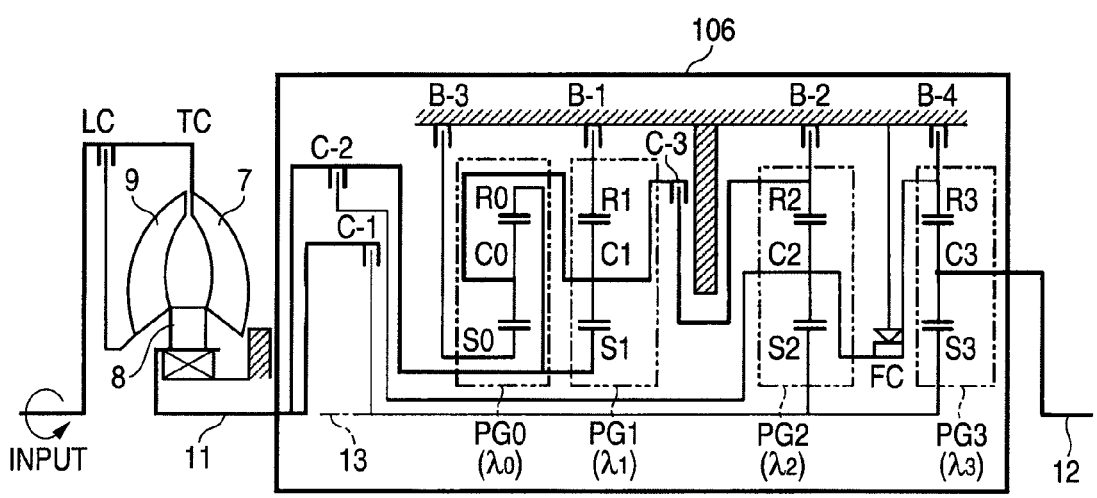
Figure 5:
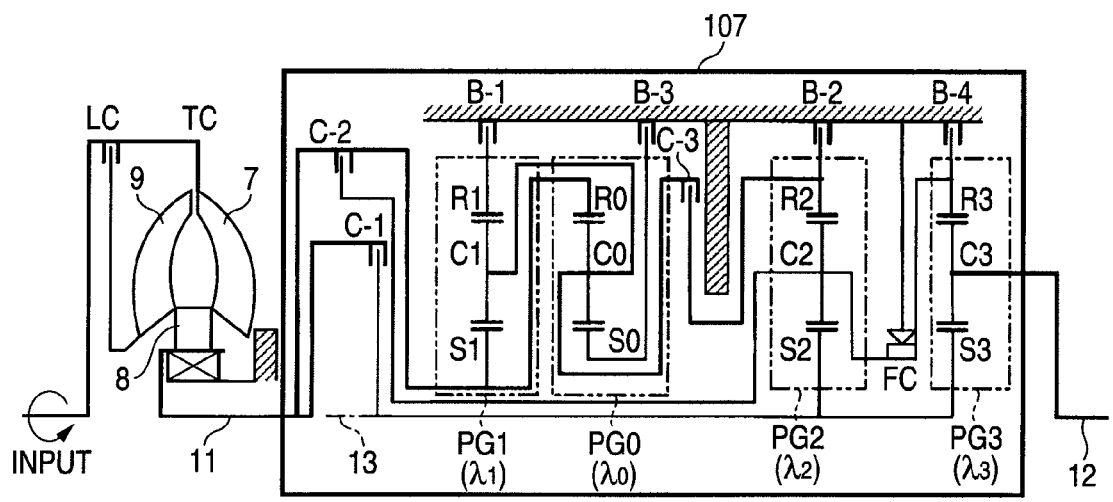
FIGS. 5 (a) and (b) are block diagrams showing schematic structures according to a seventh embodiment and an eighth embodiment of the present invention, respectively.
Figure 5:
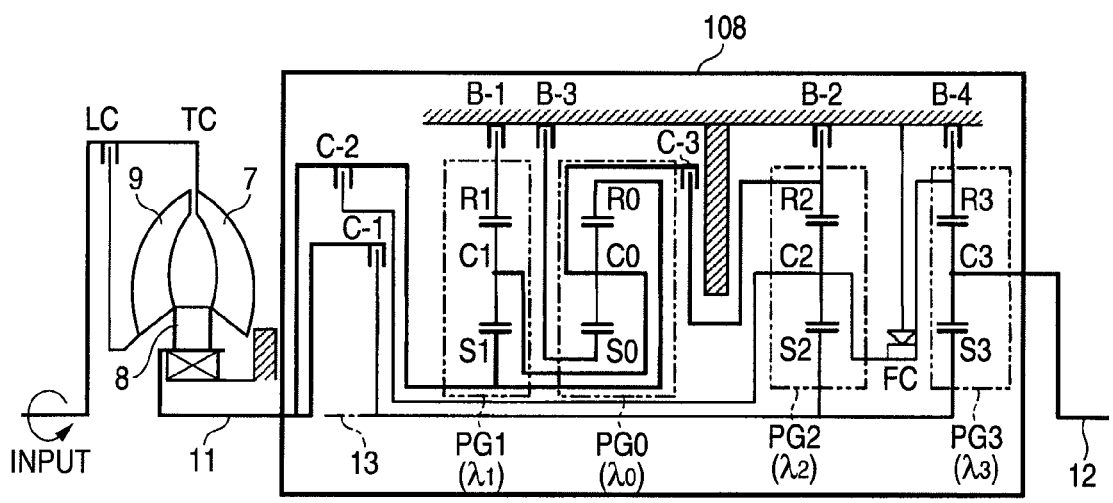
Figure 6:
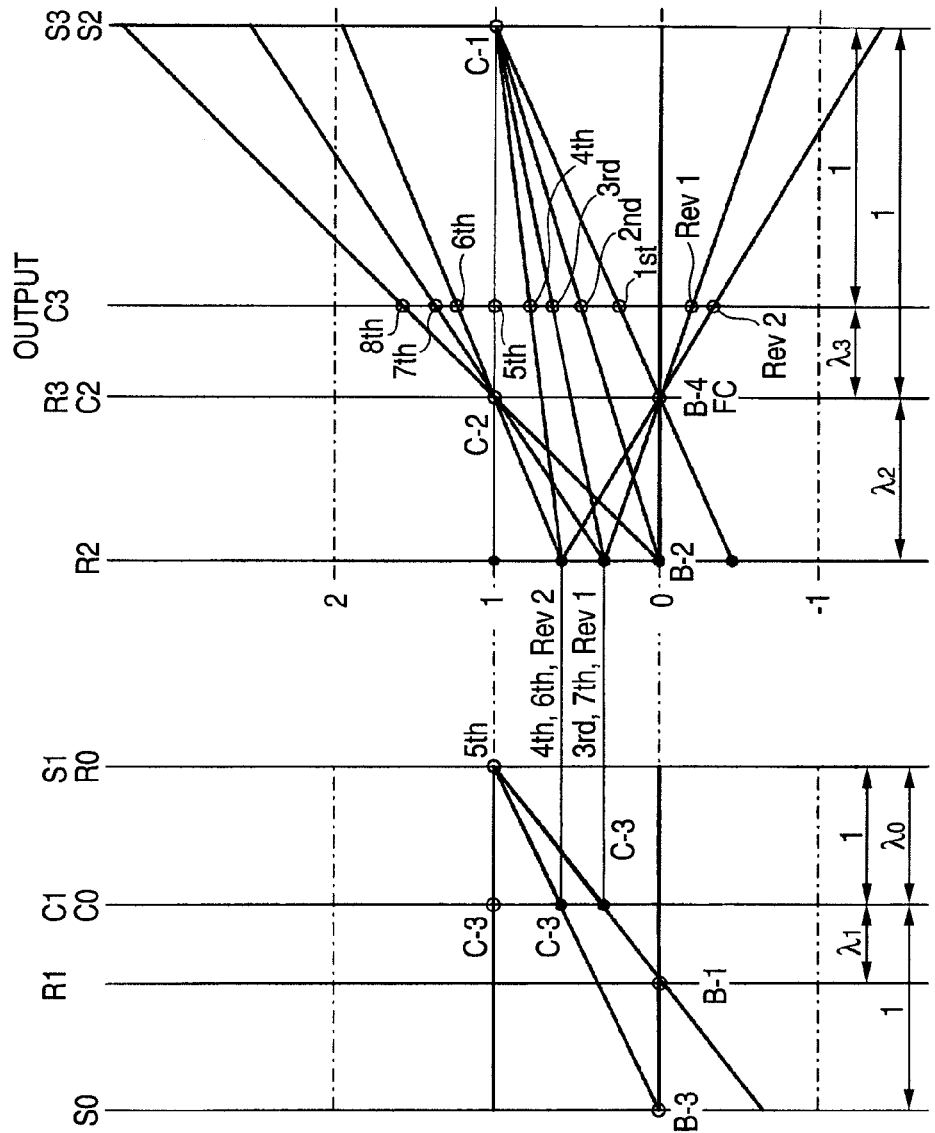
FIG. 6 A graph showing a speed line diagram common to automatic transmission apparatuses 105 to 108 shown in FIG. 4 and FIG. 5.
Figure 8:
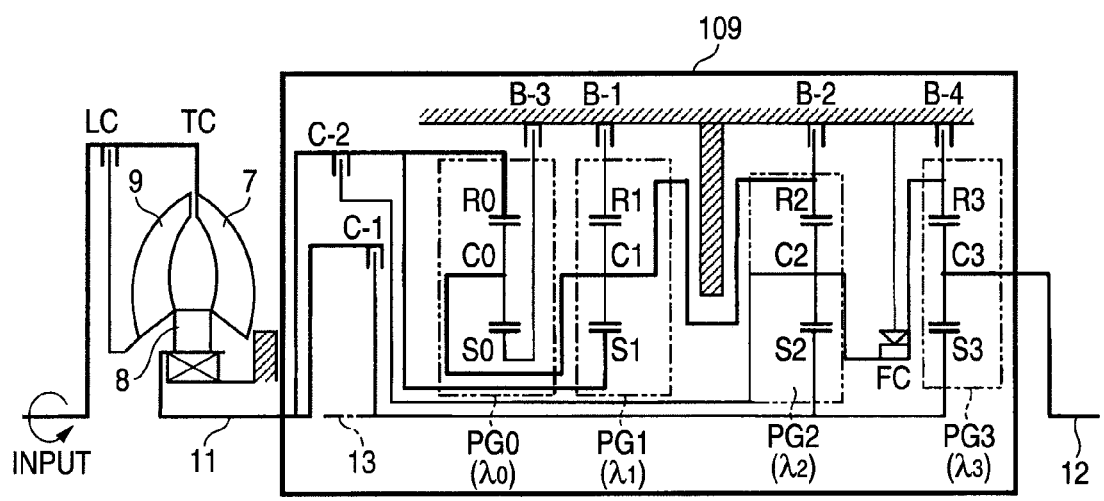
FIGS. 8 (a) and (b) are block diagrams showing schematic structures according to a ninth embodiment and a tenth embodiment of the present invention, respectively.
Figure 8:
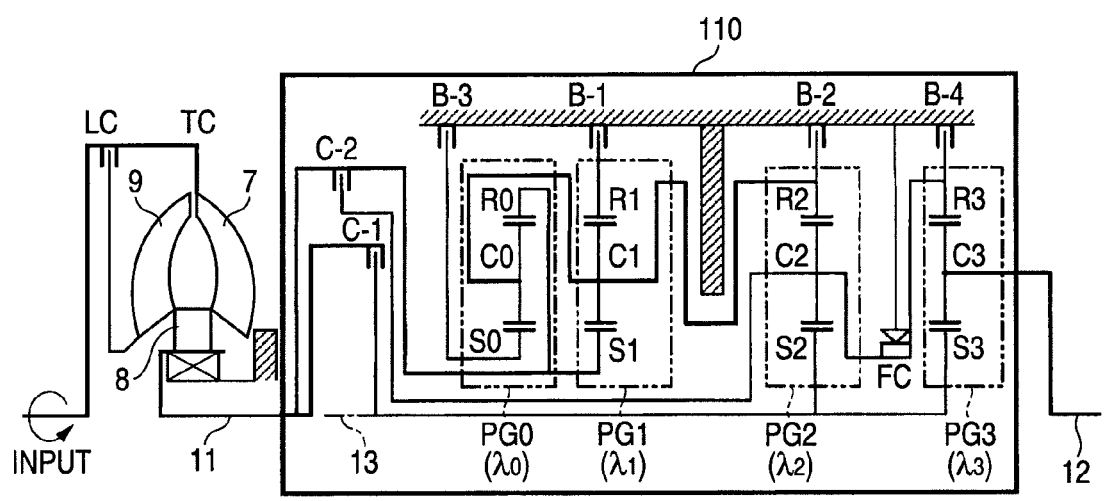
Figure 9:
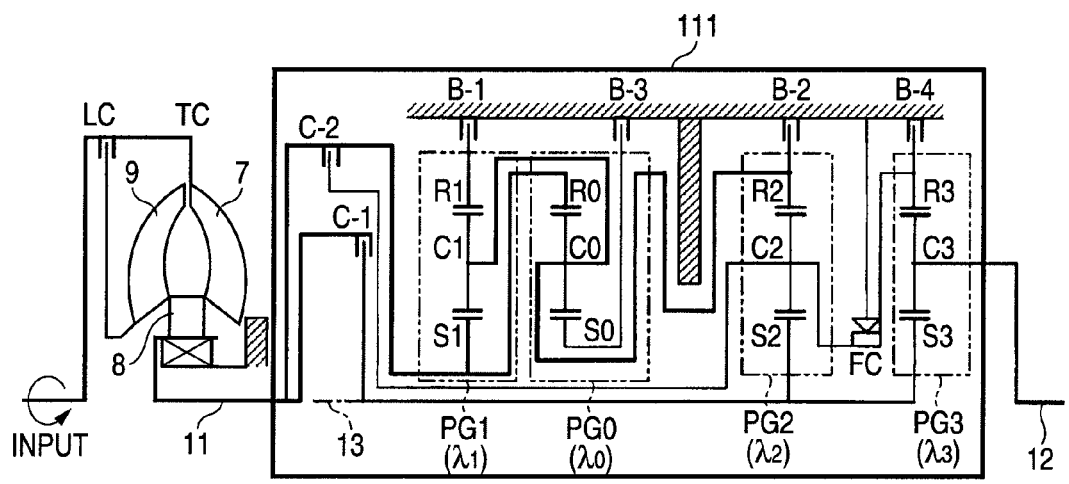
FIGS. 9 (a) and (b) are block diagrams showing schematic structures according to an eleventh embodiment and a twelfth embodiment of the present invention, respectively.
Figure 9:
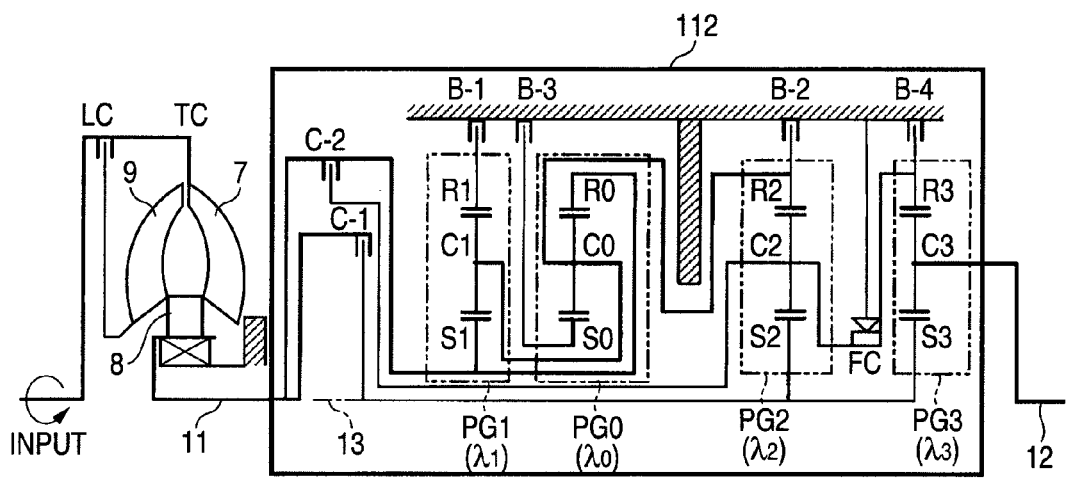
Figure 10:
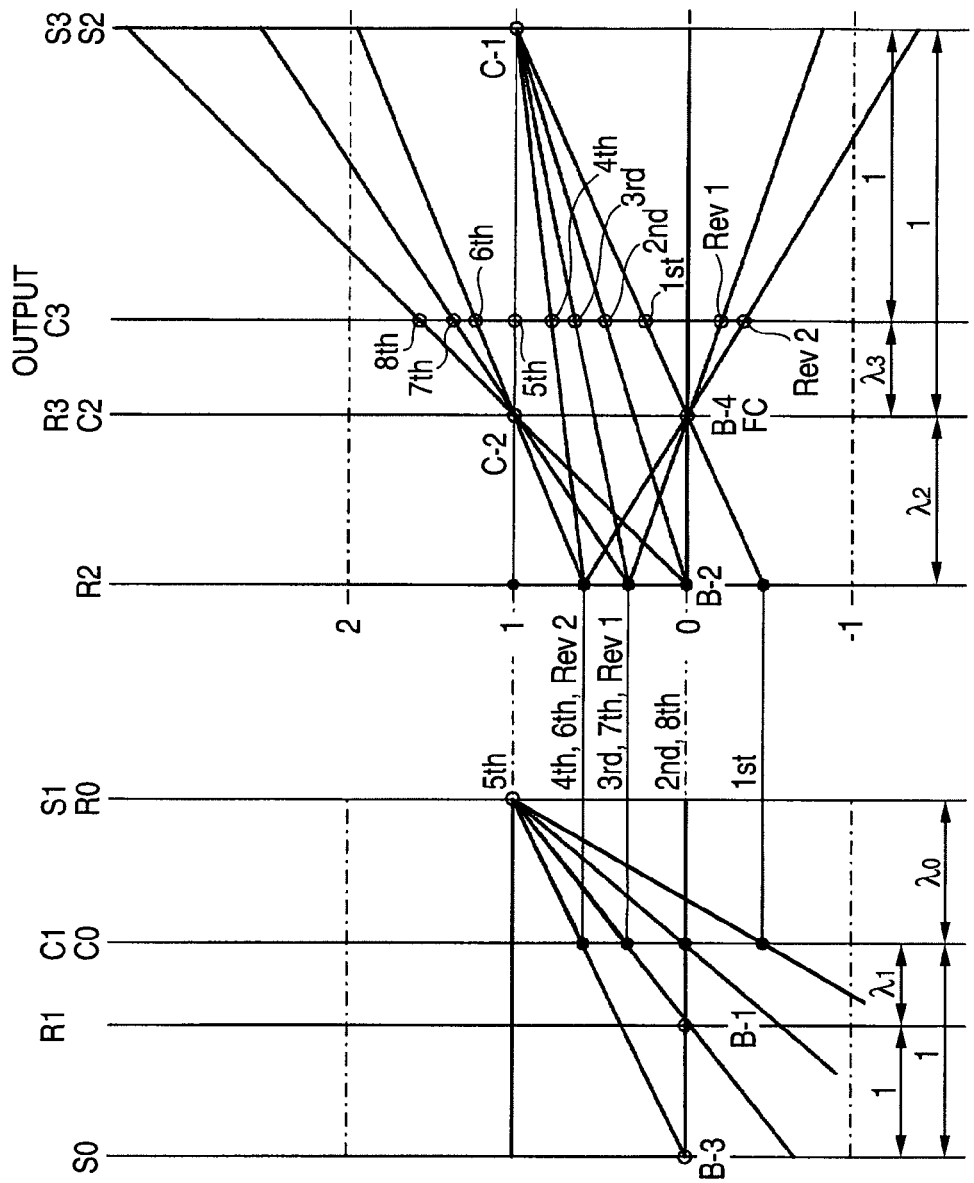
FIG. 10 A graph showing a speed line diagram common to automatic transmission apparatuses 109 to 112 shown in FIG. 8 and FIG. 9.

LC: lock-up clutch
TC: torque converter
7: pump impeller
8: stator
9: turbine
101 to 112: automatic transmission apparatuses
11: input shaft
12: output shaft
13: common axis
C-1 to C-3: first to third clutches
B-1 to B-4: first to fourth brakes
FC: one-way clutch
PG0 to PG3: first to fourth planetary gear devices
S0 to S3: sun gears
C0 to C3: carriers
R0 to R3: ring gears

The invention claimed is:

1. An automatic transmission apparatus including:
an input shaft and an output shaft;
a first planetary gear device having a ring gear rotationally driven by the input shaft, a pinion intermeshing with the ring gear, a sun gear intermeshed with the pinion, and a carrier that supports the pinion;
a second planetary gear device having a sun gear connected to the ring gear of the first planetary gear device, a pinion intermeshing with the sun gear, a ring gear intermeshing with the pinion, and a carrier that supports the pinion and that is connected to the carrier of the first planetary gear device;

a third planetary gear device having a ring gear connected to the carrier of the second planetary gear device, a pinion intermeshing with the ring gear, a sun gear intermeshing with the pinion, and a carrier that supports the pinion;

a fourth planetary gear device having a sun gear connected to the sun gear of the third planetary gear device, a pinion intermeshing with the sun gear, a ring gear intermeshing with the pinion and connected to the carrier of the third planetary gear device, and a carrier that supports the pinion and that is connected to the output shaft;

a first clutch that selectively connects the sun gear of the third planetary gear device to the input shaft;

a second clutch that selectively connects the carrier of the third planetary gear device to the input shaft;

a first brake that selectively regulates the rotation of the ring gear of the second planetary gear device;

a second brake that selectively regulates the rotation of the ring gear of the third planetary gear device;

a third brake that selectively regulates the rotation of the sun gear of the first planetary gear device; and a fourth brake that selectively regulates the rotation of the ring gear of the fourth planetary gear device.

2. The automatic transmission apparatus according to claim 1, further including a third clutch that selectively connects the ring gear of the first planetary gear device to the input shaft.

3. The automatic transmission apparatus according to claim 1, further including a third clutch that selectively connects the ring gear of the third planetary gear device to the carrier of the second planetary gear device.

* * * * *